United States Patent [19]

Parodi

[11] 3,771,616

[45] Nov. 13, 1973

[54] SNOW VEHICLE

[76] Inventor: Alfred Parodi, 15 Acacia Ln., Redwood City, Calif. 94062

[22] Filed: Jan. 26, 1972

[21] Appl. No.: 220,757

[52] U.S. Cl.................... 180/6.7, 180/9.2, 180/9.24
[51] Int. Cl......................... B62d 11/06, B62d 21/08
[58] Field of Search..................... 180/6.7, 9.2, 9.24, 180/9.52, 6.2, 6.48; 115/1 R

[56] References Cited
UNITED STATES PATENTS

| 3,219,133 | 11/1965 | Clowers | 180/6.7 |
| 1,299,937 | 4/1919 | Hatfield | 180/6.7 |
| 2,483,473 | 10/1949 | Passeleque | 180/6.7 X |
| 3,358,634 | 12/1967 | Pratt | 115/1 R |
| 3,367,435 | 2/1968 | Elq | 180/6.2 |
| 3,385,255 | 5/1968 | Raymond | 180/6.48 |

Primary Examiner—Kenneth H. Betts
Assistant Examiner—John A. Pekar
Attorney—Julian Caplan

[57] ABSTRACT

A track-type snow vehicle has engine and transmission located on a chassis so that the center of mass of the vehicle is below the middle of the body. The drive from the transmission is forward to a differential and thence to sprockets on the forward ends of the two tracks. Seats in the body are disposed forward and rearward and to either side of the middle of the body. The vehicle has proper weight distribution for stability and short turning radius and permits seating four passengers.

3 Claims, 4 Drawing Figures

SNOW VEHICLE

This invention relates to a new and improved snow vehicle. Heretofore, small size snow vehicles have been restricted to two-passenger capacity. Larger passenger capacity required heavy, high vehicles. The present invention employs a small chassis yet has seating capacity for four.

Another feature of the invention is the fact that it requires only a small air-cooled engine such as four-cycle four cylinder Volkswagen type but the engine is coupled to an automatic transmission. The engine is mounted backwards on the chassis (as compared with the normal mounting of the engine in an automobile) with the transmission foward of the engine and the differential and driving axles at the front. This arrangement of the prime mover and the chassis construction are among the important features of the present invention.

Another feature of the invention is the construction of the chassis frame. A pair of side frame members is located immediately inside the tracks, the side members being slanted upwardly and laterally inwardly at the middle of the chassis to provide a mounting for the engine and transmission.

One of the important advantages of the invention is the location of the engine and transmission in the middle of the vehicle so that the center of mass is centrally located. This location permits easy turning and also gives the vehicle great stability.

Another advantage of the arrangement heretofore described is that four or even five passengers may be seated comfortably in the body. There is one seat on each side forward of the engine and a bench-like seat rearward of the engine which can accommodate two and even three passengers.

A further feature of the arrangement is that the center of gravity is low, giving the vehicle stability. The crank shaft of the engine is located below the body floor but portions of the engine extend up into the body and between the front seats and are covered by a removable cover. This location also permits easy access to the engine for minor repairs and adjustments.

Other objects of the present invention will become apparent upon reading the following specification and referring to the accompanying drawings in which similar characters of reference represent corresponding parts in each of the several views.

Figure 1:
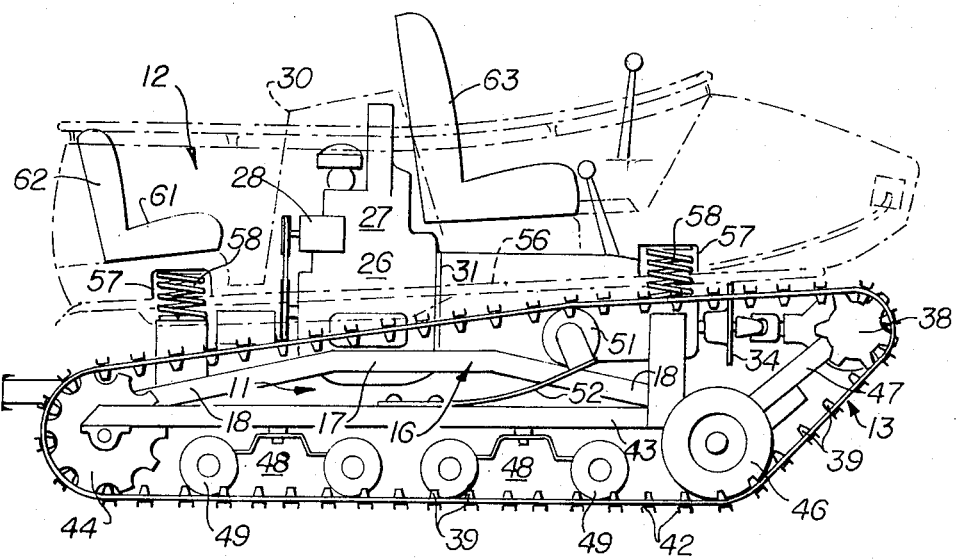
FIG. 1 is a side elevation of the vehicle, the outline of the body being shown in dot-and-dash lines in order to reveal the construction of the interior of the body.

The snow vehicle of the present invention is provided with a chassis 11 on which is mounted a body 12, all supported by tracks 13, one on each side of the vehicle.

Chassis 11 has a pair of side frame members 16 which extend from front to rear and are at their widest and lowest points at front and rear. At about the middle of each member 16 is a horizontally inset portion 17 and forwardly and rearwardly of portion 17 are downwardly-outwardly slanting connecting portions 18. Transverse rear cross member 19 connects the rearward ends of frame members 16. Slightly forwardly and rearwardly of inset portions 17 are horizontal transverse forward and rearward engine mounting cross members 21, 22. Additional cross members 23 are located to brace the sides 16.

Figure 2:
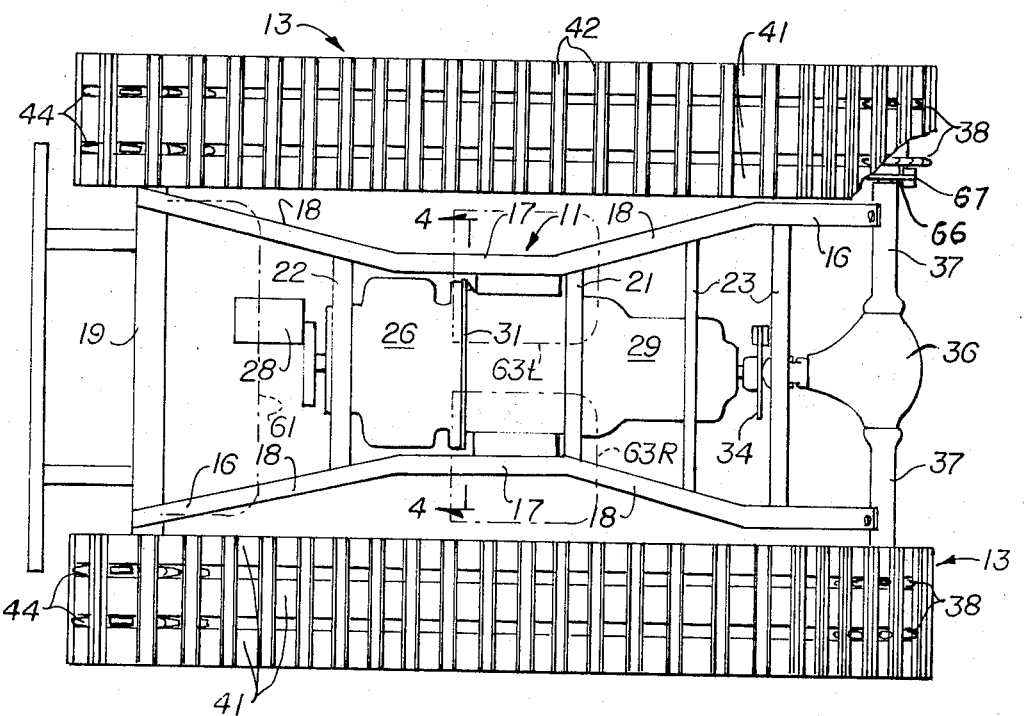
FIG. 2 is a bottom plan.
Figure 3:
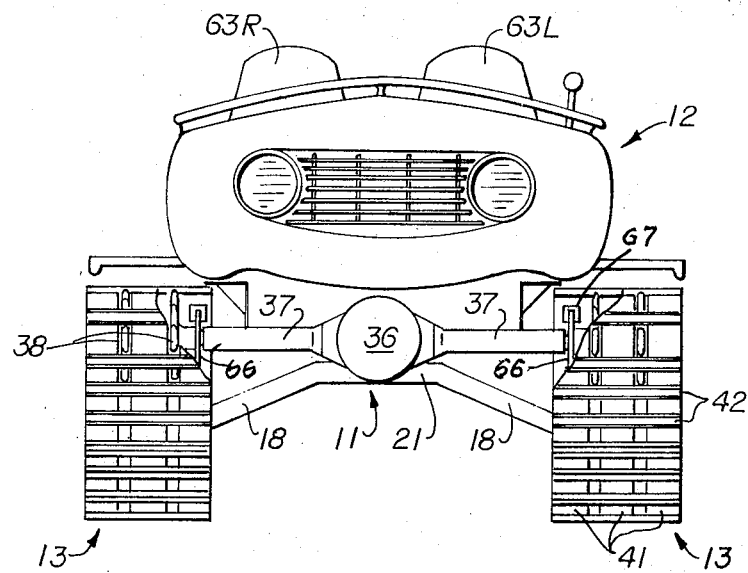
FIG. 3 is a front elevation.
Figure 4:
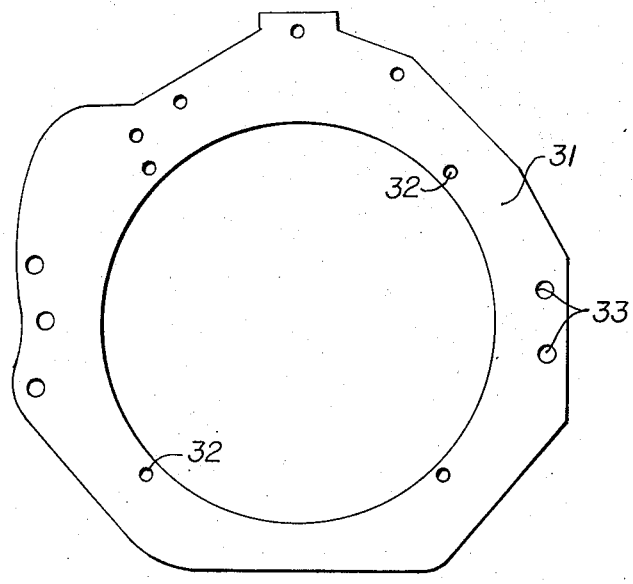
FIG. 4 is an enlarged view of the adapter plate between the engine and the transmission as viewed substantially along the line 4—4 of FIG. 2.

Engine 26, as has been explained, may be a common four-cycle four-cylinder air-cooled Volkswagen engine, although other small engines may be employed. The engine is mounted in the reverse of the normal position in a Volkswagen in that the drive shaft (not shown) is directed forwardly and is connected to an automatic transmission 29 with the use of an adapter plate 31. As is best shown in FIG. 2, the engine and the rearward portion of the transmission 29 are supported in a substantially rectangular sub-frame consisting of the insets 17 and the cross members 21, 22. As is shown in FIG. 1, the upper portions 27 of the engine 26 extend up above the chassis 11 and into the middle of the body 12. These portions are normally concealed by a cover 30 which is in the middle of the body 12 but upon removal of the cover 30 the engine 26 is accessible for adjustment and minor repairs. As shown in FIGS. 1 and 2, a starter mechanism 28 may be located within cover 30 and driving the engine 26 through a gear and flywheel. Since the transmission 29 is not usually connected to an engine 26, adapter plate 31 (shown in FIG. 4) is required. The plate 31 has a central hole having a diameter equal to that of the opening in the forward end of engine 26. Inner series of holes 32 is provided for bolting the adapter plate 31 to the engine. An outer series of holes 33 is provided to bolt plate 31 to the open rearward end of transmission 29. The external configuration of plate 31 matches that of the rearward end of the transmission 29.

Forward of transmission 29 is a disc 34 which may be engaged by friction brake shoes (not shown) for stopping the vehicle. Other braking means may be used. At the forward end of the vehicle is a differential housing 36 containing differential gears (not shown) which drive the transverse axles (also not shown) which are located within housings 37. On the outer end of each axle is a drive sprocket 38 driving one of the tracks 13. The sprocket 38 fits inside track lugs 39 which are located on the inside surfaces of three continuous track belts 41. Transverse outside track grippers 37 are fastened to the outsides of the belt 41 fastening the same for movement together and also providing traction for the machine. For this purpose the grippers 42 are best shaped as shallow channels. Extending horizontally substantially the entire length of the machine and within the tracks 13 are horizontal track frame members 43, one on each side. Rear idler sprockets 44 are journalled in the rearward ends of members 43. A front track take-up roller 46 which may be in the form of a small wheel having a pneumatic tire and which is disposed to roll between lugs 39 is mounted on arm 47 connected to housing 37. Supporting member 43 are a pair of trucks 44 having rollers 49 which engage the bottom stretch of track 13 between the lugs 39. There is also a top track tightener roller 51 which is biased upwardly by means of bracket 52 attaching the latter to member 43. As is best shown in FIG. 1, the bottom stretch of each track 13 is horizontal and forwardly of roller 46 the track slants upwardly-forwardly around sprocket 38 and then proceeds generally downwardly-rearwardly. Roller 51 prevents slapping of the track. The sprocket 44 is at the rear end of the track.

The body 12 has a somewhat rearwardly slanted floor 56 having inset spring housings 57 which receive coil springs 58, the lower ends which bear against the chassis 13. Springs 58 provide a comfortable support for body 12. Rearward of engine 26 is a transverse horizontal rear seat cushion 61 which extends across the width of body 12 and will normally seat at least two passengers and also a third passenger in the middle if large leg room is not required for the third rear seat passenger. A seat back 62 is preferably provided for the cushion 61. Forwardly of engine 26 on either side of the body 12 is a front seat 63 which may be of a contoured shape or which may, alternatively, have a cushion and back.

The center of mass of the vehicle is located at about the middle of the adapter plate 61 which is at about the middle of the vehicle when viewed in plan and is low relative to the elevation of the body 12 when viewed in side elevation. This weight distribution of the empty vehicle permits the positioning of the passengers one on each side ahead of the engine and one on each side behind the engine. This accommodates four passengers, a unique feature in a small snow vehicle. Another feature of the weight distribution is the fact that the vehicle may turn about a small turning radius by stopping the turning of one track and permitting the other to turn by means of differential 36. Individual brakes disks 66 connected to sprockets 38 assist in turning the vehicle with use of brakes 67. Still another advantage of the arrangement is the fact that the center of gravity of the vehicle is low, giving it great stability particularly when climbing slopes and traversing rough terrain, still allowing a high ground clearance.

What is claimed is:

1. A snow vehicle comprising a chassis having longitudinal side frame members and a support at about the midpoint of said chassis when viewed in plan, an engine having a crankshaft extending out through its open front end and located on said support with said crankshaft longitudinal and said open front end forward, a transmission immediately forward of said engine, said transmission having a drive shaft extending rearward through one open end, said crankshaft and drive shaft aligned and coupled together and which further comprises an annular adapter plate and means connecting said plate to said open ends of both said engine and said transmission, a body mounted above said chassis, the upper part of said engine extending up into the middle of said body, seats forward and rearward of said upper part, tracks on either side of said chassis, means mounting said tracks, and drive means connected to the forward ends of said transmission for driving said tracks from their forward ends, said vehicle being characterized by the fact that its center of mass is centrally located relative to said vehicle by reason of location of said support, engine, and transmission centrally relative to said chassis.

2. A vehicle according to claim 1 wherein either of said tracks may be disconnected from said transmission, whereby said vehicle may turn about a short turning radius about said center of mass.

3. A snow vehicle comprising a chassis having longitudinal side frame members and a support at about the midpoint of said chassis when viewed in plan, an engine and transmission connected together and fixed to said support, a body mounted above said chassis, the upper part of said engine extending up into the middle of said body, seats forward and rearward of said upper part, tracks on either side of said chassis, means mounting said tracks, and drive means connected to said transmission for driving said tracks, said vehicle being characterized by the fact that its center of mass is centrally located relative to said vehicle by reason of location of said support centrally relative to said chassis, each said side frame member slanting upwardly and inwardly from its forward end and also from its rearward end to an elevated, horizontal, longitudinal, central, laterally inset portion, and horizontal transverse forward and rear cross members interconnecting said side frame members forward and rearward of said inset portions, said inset portions and forward and rear cross members comprising said support.

* * * * *